Aug. 11, 1936.  F. J. ADAMS  2,050,911
BASKET
Filed July 22, 1935
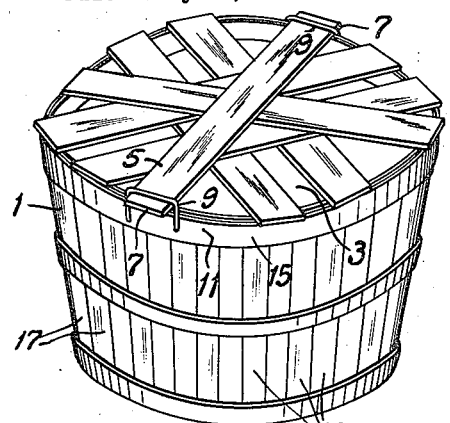
FIG.1.
FIG.2.
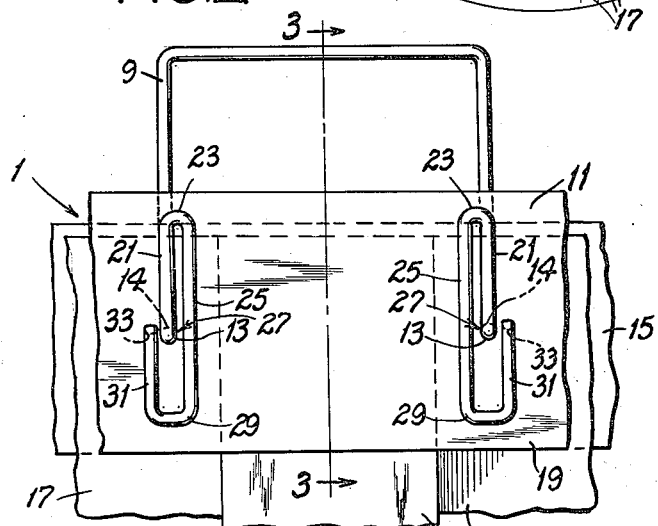
FIG.3.
FIG.4.
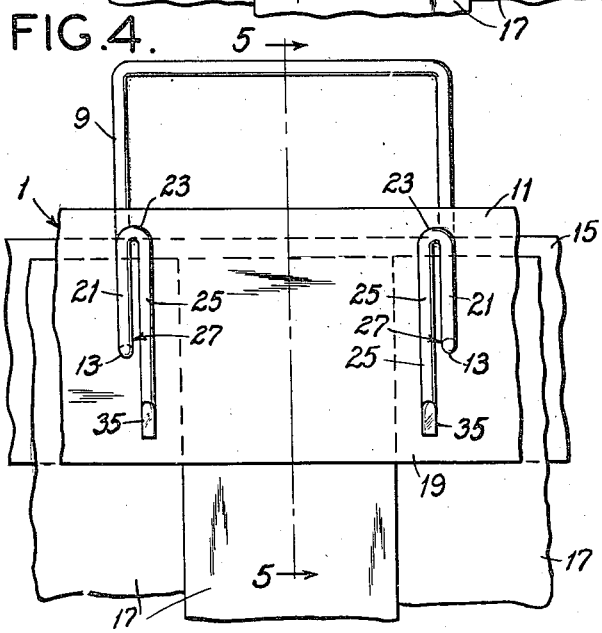
FIG.5.
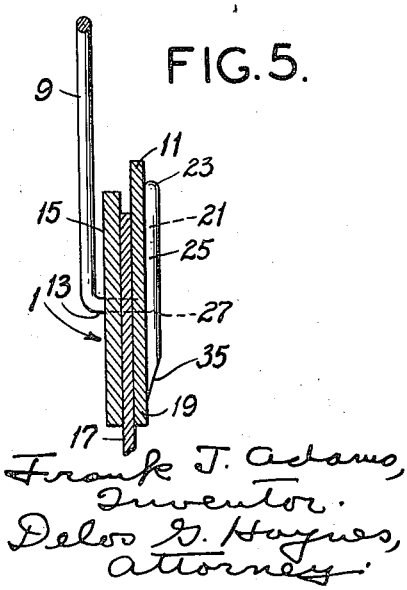
Frank J. Adams,
Inventor.
Delos G. Haynes,
Attorney.

Patented Aug. 11, 1936

2,050,911

UNITED STATES PATENT OFFICE 2,050,911

BASKET

Frank J. Adams, University City, Mo., assignor to Fruit Supply Company, St. Louis, Mo., a corporation of Missouri Application July 22, 1935, Serial No. 32,490

12 Claims. (Cl. 217—125)

This invention relates to baskets, and with regard to certain more specific features, to baskets for containing produce.

Among the several objects of the invention may be noted the provision of an improvement over the construction such as shown in United States Patent 1,440,740 issued to T. D. Massee, and United States Patent 1,786,998 issued to Ernest V. Hawkins; the provision of an improved construction which provides for a handle and cover holder which, upon bending outward and inward to effect an interlock, does not move parts to puncture the contained produce; the provision of a construction of the class described which eliminates undesirable metal portions at the upper edge of the basket; and the provision of a relatively simple construction to effect the purpose. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a perspective view of a basket showing the invention;

Fig. 2 is an inside elevation of a handle, shown applied to a basket whose cover is removed;

Fig. 3 is a cross-section taken on line 3—3 of of Fig. 2;

Fig. 4 is a view similar to Fig. 2 but showing a modification; and

Fig. 5 is a cross-section taken on line 5—5 of Fig. 4.

Similar reference characters indicate corresponding parts throughout the several views of the drawing.

In said Patent 1,786,998 is shown a holder and handle for baskets composed of an inverted U-shaped member which has the legs passing downwardly, then through the wall of the basket at the upper hoop level, to the inside thereof, then up, the upper end of same being clinched over the upper edge of the basket.

A disadvantageous part of this former construction is that the single portion of wire that extends along the inner side of the basket results in the requirement for a clinch over the upper hoop of the basket, in order to prevent the angling in of said single portion upon deformation of the U-shaped handle, as would occur in the Massee Patent 1,440,740 construction. Instead of arranging a single inner length of the wire along the inside of the basket wall, and to avoid the clinch, I have arranged it as follows:

Referring to the drawing, there is shown at numeral 1 a basket having a cover 3, the upper slat 5 of which has extensions 7 which project laterally beyond the upper periphery 11 of the basket 1 to provide an interlock within inverted U-shaped wires 9, the latter holding down the cover and also functioning as handles before application of the cover or after bending the wires 9 out and removing the cover.

To properly hold the inverted U-shaped wires to the upper rim 11 of the basket, I direct their lower ends inwardly as shown at numeral 13, piercing with a portion 14 the outer hoop 15, side slats 17 and more or less centrally of an inner hoop 19 of the basket. Then, I direct the inner portions of the wires upwardly along the inner wall of the inside hoop 19 to form one leg 21 of a hair-pin structure. At the upper end of the leg 21, and spaced from the upper edge of the hoop 19, I provide a hair-pin turn 23 and then a downwardly directed portion 25 which proceeds past the entry portion 27 of the wire. The length of wire 25 is continued downwardly past the entry portion 27 to a point spaced from the lower edge of the inner hoop 19, and by a second hair-pin turn 29, is again directed upwardly as shown at the length 31. The end of the length 31 is sharpened, bent over, and directed into the wood of the inner hoop 19 but does not pass entirely through the wall of the basket. Numeral 33 shows the sharpened, bent over and piercing portion. A deleterious final clinch is avoided.

Or, as shown in Fig. 4, the length of wire 25 may be cut off so as to dispense with the lower hair pin turn 29 and the length 31. The modified form of Fig. 4 also shows another feature consisting in chamfering the terminal of the wire as shown at numeral 35. It is to be understood that the terminal point 33, or the chamfer 35 may be used for determining the wire inside the basket, in either the shape of wire shown in Fig. 2 or Fig. 4.

The advantage of the present construction lies in the fact that when the basket is finished and provided with a handle and is loaded with produce, the inverted U-shaped wire 9 may be bent outwardly so that the cover 3 may be properly positioned; then the U-shaped wire 9 bent back again over the extension 7.

If the portions of the wire within the basket consists of a single reach, such as shown in Figs. 2 and 3 of the Massee Patent 1,449,740 then, when the U-shaped portion is again bent in, the interior legs of the wire will move inwardly to damage the contained produce. Hawkins Patent 1,786,998 attempts to solve this problem by providing a clinch over the upper edge of the basket, but this interferes with the seating of the lid in cases where this is desirable.

With my invention, the length of wire 25 which is directed downwardly proceeds to a point below the entry portion 27 of the wire through the basket. All portions of the wire below this point of entry, including the hair pin turn 29 and the upwardly directed reach 31 (where used, as in Fig. 2), as well as the part of the reach 25 below said point of entry (where used alone, as in Fig. 4), resist any tendency of the portions of the wire above the point of entry to be bent inwardly. Hence each region 13 outside of the basket is the locus of both outward bending and inward bending, the portions 21, 23, 25, 29 and 31 remaining substantially flat against the inside of the basket. In short, the wire is formed inside of the entering wire 27 as a T-shape or crowfoot (Figs. 2 and 4), instead as an L-shape (see the Massee patent). Furthermore, the hair pin turns such as 23 and 29 are harmless to the produce, and likewise the terminal constructions 33 and/or 35, even if contacted by the produce.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A wire handle for baskets comprising an inverted U-shaped portion lying adjacent the outside of the basket, portions projecting inwardly through the wall of the basket at the lower ends of the U-shape, continuing portions inside of the basket directed in one direction away from the point of entry of the wire and along the basket wall, said wire being then turned and directed within the basket in the opposite direction substantially past said point of entry.

2. A wire handle for baskets comprising an inverted U-shaped portion lying adjacent the outside of the basket, portions projecting inwardly through the wall of the basket at the lower ends of the U-shape, continuing portions inside of the basket directed in one direction away from the point of entry of the wire and along the basket wall, said wire being then turned within the basket and directed in the opposite direction substantially past said point of entry and within the basket, said directions being substantially parallel to the vertical axis of the basket.

3. A wire handle for baskets comprising an inverted U-shaped portion lying adjacent the outside of the basket, portions projecting inwardly through the wall of the basket at the lower ends of the U-shape, the continuing portion inside of the basket directed in one direction away from the point of entry of the wire and along the basket wall, said wire being then turned and directed in the opposite direction past said point of entry, and then turned and directed back to a point adjacent to said point of entry.

4. A wire handle for baskets comprising an inverted U-shaped portion lying adjacent the outside of the basket, portions projecting inwardly through the wall of the basket at the lower ends of the U-shape, continuing portions inside of the basket directed in one direction with respect to the point of entry of the wire through the basket, said wire being then turned and directed in the opposite direction past said point of entry, then turned and directed back to a point adjacent to said point of entry, and means at the end of the wire to present a non-cutting end to the produce within the basket.

5. A wire handle for baskets comprising a U-shaped portion extending from a point above the upper edge of the basket and lying in a plane adjacent its outer surface, inwardly directed portions piercing the basket and located at the lower ends of the U-shape, the wire being continued inwardly adjacent the inner surface of the basket in T-shaped arrangements with respect to said piercing portions and adjacent the inner wall of the basket and means determining the wire ends which are non-injurious to the contents of the basket.

6. A wire handle for baskets comprising a U-shaped portion extending from a point above the upper edge of the basket and lying adjacent its outer surface, inwardly directed portions piercing the basket and located at the lower ends of the U-shape, the wire being continued inwardly adjacent the inner surface of the basket in T-shaped arrangements with respect to said inwardly directed portions, said T-shaped arrangements having each an upwardly directed hair-pin-shaped portion and a downwardly directed hair-pin-shaped portion.

7. A wire handle for baskets comprising a U-shaped portion extending from a point above the upper edge of the basket and lying adjacent its outer surface, inwardly directed portions piercing the basket and located at the lower ends of the U-shape, the wire being continued inwardly adjacent the inner surface of the basket in T-shaped arrangements with respect to said inwardly directed portions, said T-shaped arrangements having each oppositely directed hair-pin-shaped portions, the hair-pin turns of which are concave toward the respective inwardly directed portions.

8. A wire handle for baskets comprising an inverted U-shaped portion extending from a point above the basket and adjacent the outer walls of the basket, comprising a single lateral piercing portion at each end of the U-shaped portion passing through the basket wall and integral portions lying within the basket and adjacent its inner wall extending both above and below the points of entry of the piercing portions.

9. A wire handle for baskets comprising an inverted U-shaped portion extending from a point above the basket and adjacent the outer walls of the basket, comprising lateral piercing portions passing through the basket wall and integral portions lying within the basket and adjacent its inner wall extending both above and below the points of entry of the piercing portions, said integral portions comprising hair-pin-shaped portions having their concave portions directed toward one another.

10. A wire handle for baskets comprising an inverted U-shaped portion extending from a point above the basket and adjacent the outer wall of the basket, comprising a single lateral piercing portion at each end of the U-shaped portion passing through the basket wall and portions lying within the basket and adjacent its inner wall extending both above and below the points of entry of the piercing portions, and means for terminating the wire adapted not to pierce the produce.

11. A wire handle for baskets comprising an inverted U-shaped portion extending from a point above the basket and adjacent the outer walls of the basket, comprising lateral piercing portions passing through the basket wall and integral portions lying within the basket and adjacent its inner wall extending both above and below the points of entry of the piercing portions, said integral portions comprising hairpin-shaped portions having their concave portions directed toward one another and means terminating the wire so as not to injure produce in the basket.

12. A wire handle for baskets comprising an inverted U-shaped portion lying adjacent the outside of the basket, portions projecting inwardly through the wall of the basket at the lower ends of the U-shape, the continuing portion inside of the basket directed in one direction away from the point of entry of the wire and along the basket wall, said wire being then turned and directed in the opposite direction past said point of entry, and then turned and directed back to said point of entry.

FRANK J. ADAMS.